Feb. 4, 1969   F. R. BLAU   3,425,716
GLASS UNION
Filed March 16, 1967

INVENTOR.
FRITZ R. BLAU
BY Lyon Thyon
ATTORNEYS 3,425,716
GLASS UNION
Fritz R. Blau, South El Monte, Calif.
(15664 La Subida Drive, Hacienda Heights, Calif. 91745)
Filed Mar. 16, 1967, Ser. No. 623,708
U.S. Cl. 285—110     7 Claims
Int. Cl. F16l 17/06, 19/02

ABSTRACT OF THE DISCLOSURE

A union for tubes, at least one of which is formed of glass, adapted to form a hermetical seal capable of withstanding high vacuum pressures comprising a first tube having an enlarged collar having a convexly shaped end; an enlarged bore in said first tube forming a seat; a substantially inert bushing seated on said seat and having an enlarged end portion and an annular U-shaped groove in said end portion; a rubber-like O-ring seated in said annular groove with the free edge of said O-ring sheltered within said groove; a second tube having an enlarged collar having a concavely shaped end and clamping means for engaging said collars to force said tubes together in seating relation.

---

This invention relates to a union or connector and more particularly to such a union or connector adapted to withstand extremely high vacuums and to handle very caustic or acid solutions or gases. The invention will always include two conduits to be connected, at least one of which will be formed of glass and the other of any suitable material such as glass, stainless steel, aluminum or other substances unaffected by the fluids being handled.

In particular this invention comprises an apparatus for connecting two tubes, one of which is preferably formed of a borosilicate (Pyrex) glass, and in one of which tubes there is seated a bushing formed of a substantially inert material such as polytetrafluoroethylene (Teflon), nylon, polyethylene or other synthetic material which is extremely resilient to attack by acids, alkylene solutions or gases, which bushing forms a seat for a resilient O-ring which is formed of a synthetic rubber such as Viton, Buna-N, etc., the extremity of which seat forms a lip which covers the free end of the O-ring to prevent exposure of the O-ring to the corrosive fluids when the other tube is connected to the first tube. The first and second tubes have enlarged collars which form matching convex and concave seats adapted to be held together by conventional clamps to retain the aforesaid bushing and O-ring and to establish a hermetical seal. The invention is useful where either of the tubes to be connected is formed of glass and where the other tube may be also formed of glass or of some material such as stainless steel or aluminum. For straight metal to metal connections simpler less expensive expedients are available.

It is accordingly one object of this invention to provide a union or connector of the type described which is capable of handling very high vacuums on the order of $10^{-8}$ millimeters of mercury or higher and at the same time very caustic or acid solutions by reason of the fact that the sealing means is fully protected from contact by the caustic fluids.

It is a feature of this invention that two tubes, at least one of which is formed of glass, are joined by conventional clamping means acting upon collars formed upon the tubes, while a seal is formed by a synthetic rubber ring, which synthetic rubber ring is protected from the destructive action of caustic fluids by reason of a protective lip formed upon a retainer for the O-ring, which retainer acts as a bushing in one of the two tubes to be joined.

These and other objects, features and advantages of the invention will be apparent from the annexed drawing in which.

Figure 2:
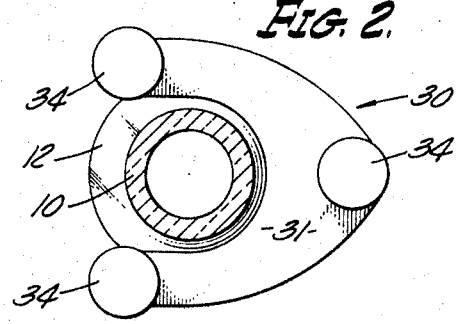
FIGURE 2 is a section taken along the line 2—2 of FIGURE 1.
Figure 3:
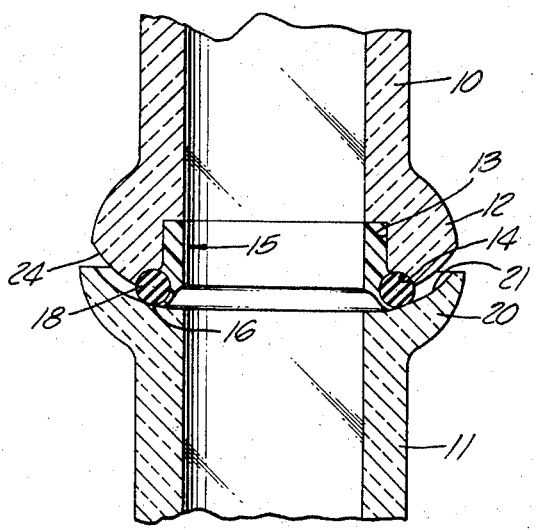
FIGURE 3 is an enlarged vertical cross-section taken on the line 3—3 of FIGURE 1 omitting the clamp.
Figure 4:
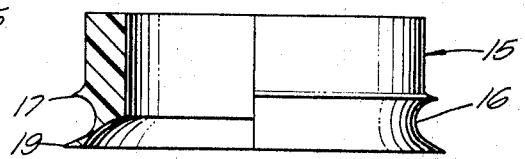
FIGURE 4 is an enlarged view partly in section and partly broken away for clarity of illustration of the bushing.
Figure 1:
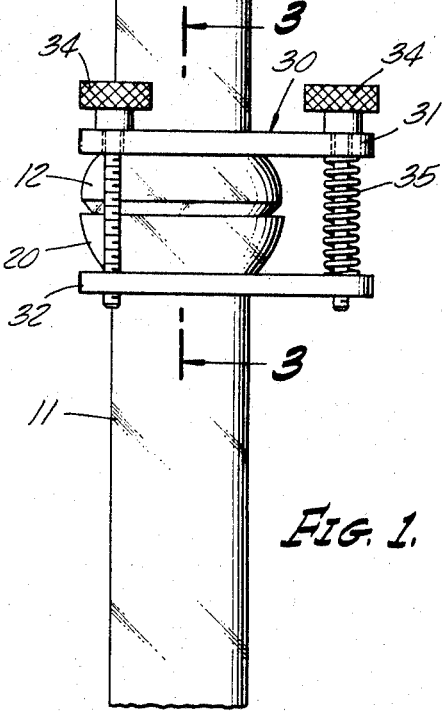
FIGURE 1 is a vertical elevation of a pair of glass tubes joined together by a clamp in accordance with the teachings of this invention.

Referring now more particularly to the drawings, the device includes two tubes 10 and 11, preferably formed of Pyrex glass. The invention herein is depicted with both tubes 10 and 11 being formed of glass, but the invention is useful and includes forming either of the tubes 10 or 11 of a nonreactive material such as aluminum, stainless steel or the like. In fact, the invention can be used in straight metal to metal connections, but is unnecessary in such cases, as for most metal to metal joints a simple threaded union will suffice. Tube 10 has an enlarged collar 12, the interior of which is enlarged to form a seat 13 and a shoulder 14. A bushing 15, preferably formed of polytetrafluoroethylene (Teflon), is provided and has the configuration shown in FIGURE 4 in which the bushing terminates in a portion presenting an annular groove 16 defined by ridges 17 and 19. The ridge 17 is of a larger diameter than the outer diameter of the bushing 15, but the ridge 19 is of still larger diameter and forms a protective lip as hereinafter described. An O-ring 18, preferably formed of a synthetic rubber such as Viton, Buna-N or polyethylene, etc., is seated in the groove 16. The inner end of the collar 12 is arcuate in cross-section as shown at 24. Glass tube 11 has an enlarged collar 20 having a concave inner portion 21 substantially complementary in curvature to the curvature of the portion 24 of tube 10. When the device is assembled as shown in FIGURES 1 and 3, the bushing 15 is inserted in the tube 10 and rests on the seat 13 with the inner edge of the ridge 17 seated on the shoulder 14. The O-ring 18 is seated in the groove 16 between the ridges 17 and 19 with the lip of the ridge 19 extending over the outer surface of the O-ring 18.

To hold the above-described assembly together a conventional clamp 30 is used. As illustrated this clamp consists of an upper clamping plate 31 and a lower clamping plate 32, each of which is tapped to receive thumb screws 34 on one of which a coil spring 35 may be mounted in the conventional form. It will be appreciated that the opening 36 in the plates 31 and 32 is larger than the tubes 10 and 11, but smaller than the collars 12 and 20 to permit the clamp 30 to clamp the two parts of the connector together.

From the foregoing description it will be noted that when the device is assembled and clamped together the O-ring 18 may be compressed and as it is compressed the lip 19 of the bushing 15 is pressed down upon the top of the O-ring 18 and forms a barrier between the O-ring and any of the corrosive fluids which may be present in the tubes and yet as the complementary surfaces 22 and 24 are brought into substantial contact with each other, not only is a tight seal formed, but a small amount of misalignment can be accommodated.

As stated above, the device of the present invention is adapted to withstand very high vacuums on the order of $10^{-8}$ millimeters of mercury or higher because of the very tight seal formed by clamping the two complementary parts together and yet the O-ring 18 of synthetic rubber will not be attacked by either highly caustic or highly acid solutions or gases because of the protective Teflon lip 19 of the bushing 15 which overlies and shields the O-ring 18.

While there has been described what is at present considered a preferred embodiment of the present invention, it will be appreciated by those skilled in the art that various changes and modifications can be made therein without departing from the essence of the invention.

I claim:

1. A union for tubes, at least one of which is formed of glass, adapted to form a hermetical seal capable of withstanding high vacuum pressures comprising a first tube having an enlarged collar having a convexly shaped end; an enlarged bore in said first tube forming a seat; a substantially inert bushing seated on said seat and having an enlarged end portion and an annular outwardly facing U-shaped groove in said end portion; a rubber-like O-ring seated in said annular groove with the free edge of said O-ring sheltered within said groove; said O-ring and said enlarged end portion of the bushing extending beyond the end of said first tube; a second tube having an enlarged collar having a concavely shaped end and clamping means for engaging said collars to force said tubes together in seating relation whereby the end portion of said inert bushing and said O-ring engage the internal surface of said concavely shaped end and said inert bushing shields and protects said O-ring from the contents in said tubes.

2. A union as set forth in claim 1 in which said annular groove is defined by a pair of outstanding ridges, the outermost of said ridges forming a protecting lip which overlies said O-ring and protects said O-ring from the contents of said tubes.

3. A union as set forth in claim 1 in which said bushing is formed of polytetrafluoroethylene.

4. A union as set forth in claim 1 in which said O-ring is formed of synthetic rubber.

5. A union as set forth in claim 1 in which said first tube is provided with a second enlarged bore adjacent to but spaced from said first enlarged bore towards the free end of said tube; said U-shaped annular groove in said bushing being defined by a pair of outstanding ridges, the innermost of said ridges being seated against the shoulder of said second enlarged bore and the outermost of said ridges forming a protecting lip which overlies said O-ring and protects said O-ring from the contents of said tubes.

6. A union as set forth in claim 5 in which said bushing is formed of polytetrafluoroethylene.

7. The union of claim 5 in which said O-ring is formed of synthetic rubber.

References Cited

UNITED STATES PATENTS

| 2,240,078 | 4/1941 | Rader. | |
|---|---|---|---|
| 2,362,686 | 11/1944 | De Zano | 285—332.3 |
| 3,140,097 | 7/1964 | Luertzing. | |
| 3,249,372 | 5/1966 | Pollack | 285—332.3 X |

THOMAS F. CALLAGHAN, *Primary Examiner.*

U.S. Cl. X.R.

277—189, 214; 285—423, 332.3, 364